United States Patent

[11] 3,596,005

[72] Inventor Robert Edward Hamilton
Chelmsford, Mass.
[21] Appl. No. 791,547
[22] Filed Jan. 13, 1969
[45] Patented July 27, 1971
[73] Assignee Viatron Computer Systems Corporation
Burlington, Mass.

[54] CAPSTAN-FREE TAPE RECORDER
1 Claim, 4 Drawing Figs.

[52] U.S. Cl. .......... 179/100.2 S, 242/178, 318/318
[51] Int. Cl. .......... G11b15/32, G11b 15/52, B65h 17/02
[50] Field of Search .......... 179/100.1, 100.2 S, 100.2; 242/180; 318/318, 317

[56] References Cited
UNITED STATES PATENTS 2,496,103 1/1950 Neufeld .......... 179/100.2
3,350,511 10/1967 Johnson .......... 179/100.2

*Primary Examiner*—James W. Moffitt
*Assistant Examiner*—J. Russell Goudeau
*Attorney*—James J. Cannon

ABSTRACT: A tape recording and playback device in which the recording tape is moved from a supply reel to a takeup reel at a constant tape speed and where the tape is driven by a drive motor coupled directly to the tape takeup reel. The tape speed is kept constant by a prerecorded control signal on the recording tape which is fed to the motor through a control or servoamplifier. The automatic adjustment of the takeup reel speed to provide a constant tape speed eliminates additional tape drive rollers or capstans and permits the tape to be run in either direction between the reels when a second motor is connected to the tape supply reel. When the system is driving a tape in the forward direction, the takeup reel motor supplies the power using the control system and the supply reel motor is used as a dynamic brake. When the tape is running in the opposite direction, the functions of the motors are reversed.

INVENTOR.
ROBERT E. HAMILTON
BY James J. Cannon
ATTORNEY

PATENTED JUL 27 1971 SHEET 2 OF 2 3,596,005

INVENTOR.
ROBERT E. HAMILTON
BY James J. Cannon
ATTORNEY

CAPSTAN-FREE TAPE RECORDER

BACKGROUND OF THE INVENTION

The present invention relates to recording devices which utilize recording tape such as magnetic tape for storing and reproducing information including recorded digital data in the form of pulses or bits as well as other types of recorded signals. In particular, the invention relates to an improved drive means for such recording tapes wherein a constant tape speed is obtained by using a speed controlled drive motor on the tape takeup reel and whereby the usual additional tape drive wheels or capstans are eliminated. The necessary variation in takeup reel speed to compensate for the varying diameter of the tape spool on the reel is obtained by the use of a servo or motor control system utilizing a speed control signal prerecorded on the tape itself.

Prior devices of this general type usually rely upon separate tape drives or capstans which are in direct contact with the tape and which, therefore, can provide a constant tape speed. These capstans require additional mechanisms and also tend to limit tape movement for recording or playback to a single direction. A reliable speed adjustment is also difficult to obtain and is relatively complex in these prior systems. The drive system of the present invention where motors are coupled to both the supply and takeup reels is symmetrical and permits movement of the tape in either direction during recording or playback. Precise adjustments of tape speed are easily and reliably made in the drive of this new system. In prior devices of this type where speed control was based upon a signal recorded on the tape, the corrections are applied to the additional tape drive wheels or capstans themselves and this has resulted in an even more complex electromechanical control system and one which still limits the tape movement to one direction for recording or playback.

SUMMARY OF INVENTION

The tape system in accordance with the present invention is used for moving recording tape from a supply reel to a takeup reel. The tape drive motor is coupled directly to the tape takeup reel. A motor control system continually adjusts the reel speed to give a constant tape speed. The preferred method of motor control includes a prerecorded pulsed control signal on the tape. This signal is fed through a control amplifier to generate a motor drive voltage of decreasing value to continually reduce the reel speed as a diameter of the roll of tape on the takeup reel increases and to thereby provide a constant tape speed. Since no additional drive wheel or capstan is required in direct contact with the tape, bidirectional operation is obtained by providing a motor on both the takeup reel and the supply reel. During the forward operation the motor coupled to the takeup reel is coupled to the speed control system while the other motor is used as a brake. During reverse operation, the functions for the motors are reversed.

BRIEF DESCRIPTION OF THE DRAWING

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein.

DESCRIPTION OF A PREFERRED EMBODIMENT

The recording system of the present invention may be used in any tape handling system which includes a tape supply reel and a tape takeup reel and where the tape is driven past a recording head positioned on the tape path between the reels. The following description is made in connection with a tape recorder using a typical cartridge or cassette which contains both the supply and takeup reels and the tape in convenient form and where this cartridge is used with an associated tape drive means, a pickup head, and suitable signal amplifiers. Other tape handling arrangements may be used. The various elements are described and shown herein mounted on a casing or housing. However, it is clear that they must be otherwise mounted in panels or in varying physical arrangements.

Figures 1, 2:
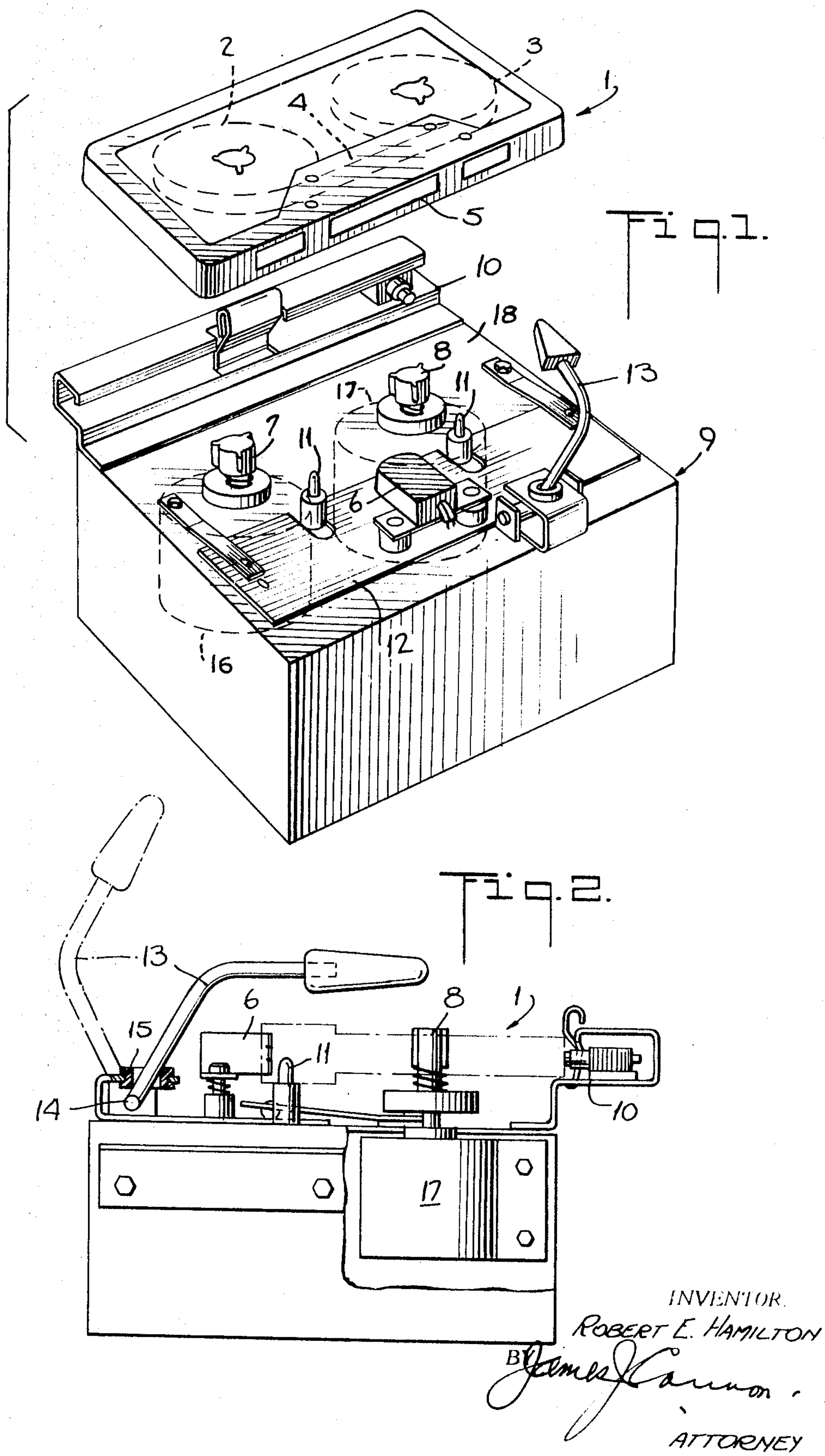
FIG. 1 is a perspective view illustrating a tape recorder in accordance with the invention where the tape supply and takeup reels are included in a unitary cartridge or cassette.
FIG. 2 is a side elevational view partially cut away illustrating the position of one of the drive motors.

FIGS. 1 and 2 illustrate a tape cartridge or cassette 1 which includes two spaced rotatably mounted tape reels 2 and 3 and related tape guide members for transporting the tape 4 between the reels and past a suitable aperture 5 in the cartridge 1 to expose the tape 4 to a pickup head 6.

Spaced spindles 7 and 8 are shown mounted in a suitable casing 9 for rotatably supporting and for driving the two reels 2 and 3 to move the tape 4 from one reel to the other. Convenient support and positioning means are provided for supporting the cartridge 1 which are shown as including a rear bracket 10 and two forward and spaced positioning pins 11. The recording and pickup head 6 is positioned on the casing 9 in position to be moved through the cartridge aperture 5 and into operative relation with the recording tape 4. A convenient means for moving the head 6 into operative position is illustrated in FIG. 1 and 2. It includes a support plate 12 slideably mounted on the casing and operatively coupled to an activating lever 13. The lever 13 is pivotally mounted at its lower end 14 and it moves the support plate 12 by means of a bearing member 15 spaced upwardly of and attached to the plate 12. Thus, when the lever 13 is moved to its downward or operating position as shown in solid lines in the figures, the support plate 12 and the attached pickup head 6 are moved forwardly and adjacent to the recording tape 4 within the cartridge 1 for pickup action. When the lever 13 is swung upwardly to the position indicated in dash-dot lines in FIG. 2, the detecting head 6 moves clear of the cartridge 1 permitting the cartridge to be removed from the recording system.

In accordance with the present invention, the two reel supports and drive spindles 7 and 8 are coupled to drive motors 16 and 17 respectively, mounted beneath the upper casing panel 18. The motor for each individual spindle operates in one condition to drive that spindle at varying and controlled speeds and in another condition to act as a brake or drag for the spindle during the time that the other spindle is being driven.

The motor control system may be described generally as follows.

A strobe or control track is first recorded on the tape 4. This control signal 19 is recorded at a constant density so that the resulting recorded pulses are equidistantly spaced during playback. For example, a capstan controlled master control tape recorder may be used to initially prepare the control track. With the tape 4 passing by the recording head at a constant speed, a constant frequency control wave train 19 will be recorded on it. Once recorded, the control track would normally never be erased and would not need to ever be rerecorded.

Once the tape 4 has been prepared by prerecording the control track 19 on it, it is ready to be loaded onto the recorder of the invention.

Power is applied to the takeup motor 17 and the tape 4 accelerates. The control signal is detected by pickup 6 and is reproduced and compared to a predetermined reference signal. A velocity servomechanism control circuit comparing the control pulses and the reference voltage then supplies the motor control voltage as the recorded control signal dictates moving the tape 4 past the head 6 at a constant velocity. The information to be stored is now recorded on the tape with head 6.

When the recorder is being used to playback information, the procedure is similar. The control signal controls the speed of the tape and the data electronics reproduces the data recorded on the tape 4.

The motor 16 on the feed reel may be connected as a dynamic brake to provide sufficient back tension to maintain sufficient head to tape contact. Where DC motors are employed, a resistive load is added to cause the supply motor to behave as a loaded generator. A similar braking is obtained for AC motors by supplying a small amount of powder to the braking motor which attempts to rotate the feed spool in a reverse direction.

Rapid stops of tape motion can be achieved by shorting the power to both motors. Where excessive tape tension is not a problem, the supply motor may be sent a reverse pulse of high power to stop it quickly.

Figures 3, 4:
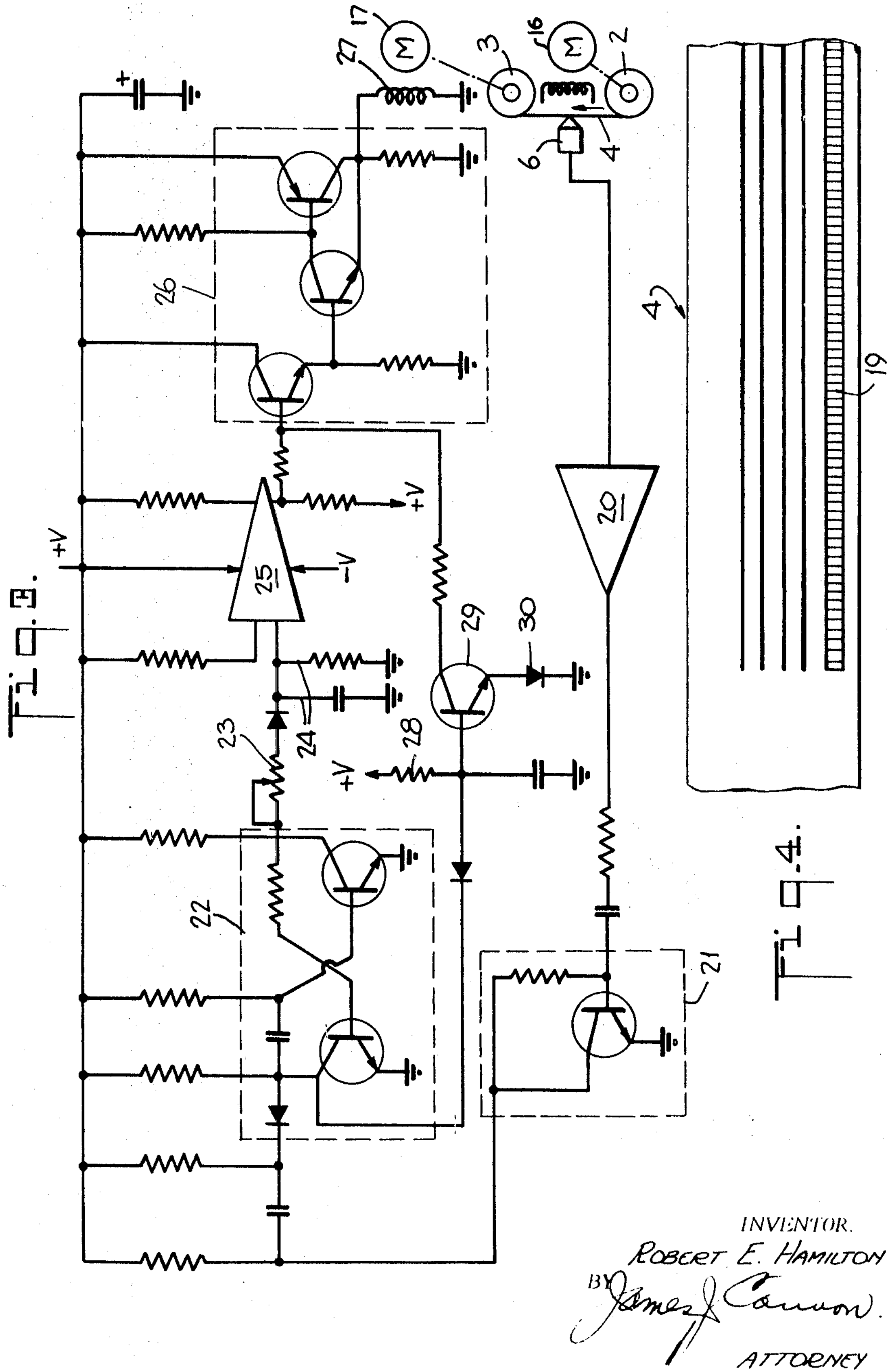
FIG. 3 is a schematic diagram illustrating a preferred embodiment of the motor control system amplifier.
FIG. 4 is a diagrammatic illustration of a section of recording tape showing one form of the signals as used in the present invention.

The details of a preferred control circuit are illustrated in FIG. 3. A recording tape 4 is shown being driven from supply reel 2 to takeup reel 3 by drive motor 17. Motor 16 is shown operating as a dynamic brake. The control signal is picked up by the packup head 6 and is first fed through a preamplifier 20. The output of amplifier 20 will be in the form of a series of rounded pulses. In order to improve the shape of the control pulses, they are first fed into a saturated amplifier stage 21 and then through a one-shot multivibrator stage 22. The pulses are squared up in the saturated amplifier stage 21 and are further squared into pulses of predetermined length by the multivibrator 22 so that the integrated value of these pulses out of the multivibrator is directly proportional to the tape speed. These pulses are now fed through an adjustable resistor 23 and into an integrating circuit 24 whose output feeds a differential amplifier 25.

A fixed reference voltage is connected to the differential amplifier and the output of the integrator as fed through the amplifier 25 and referred to this voltage produces a stabilized output control voltage. As the tape 4 speed tends to increase, the pulse rate from the tape and the output of the multivibrator circuit also increases thereby producing an increased control signal as fed into the differential amplifier which tends to reduce the amplifier 25 output and thus the motor speed. The amplifier 25 and integrating circuit 24 are adjusted so that this feed back system achieved equilibrium at the desired tape speed. The tape speed is adjusted by the adjustable resistance 23. The output of the differential amplifier is fed through a power amplifier stage 26 whose output is coupled to the field coil 27 of the drive motor 17 thereby causing drive motor speed to be continually adjusted by the above control circuit to provide for the constant tape 4 speed. In order to control the motor in the absence of a control signal from the tape and to keep the motor from running away an overriding control circuit is included. This comprises a divider network including the serial connected resistor 28, transistor 29, and diode 30 where the input of the transistor is coupled to the input of the multivibrator 22. The transistor 29 is set to conduct in the absence of a signal on the multivibrator to provide the predetermined control signal for the input of the power amplifier 26.

It will be seen that an improved drive system has been provided for tape recording systems. The direct motor coupling of the system eliminates the more intricate and delicate capstan drive elements and it also lends itself to two way operation. In two way operation the trailing motor which is in this case coupled to the tape feed wheel is available as an efficient dynamic brake.

The improved system also includes a precise and simple electrical adjustment of the tape speed which provides for an infinite degree of speed change and which eliminates the need for coarser mechanical speed controls. The control signals which are used on the tape may be those used otherwise in regular tape manufacture for initial tape testing.

As changes may be made in the construction and arrangements of the parts herein without departing from the spirit and scope of the invention and without sacrificing any of its advantages, it is to be understood that all matter herein is to be interpreted as illustrative and not in a limiting sense.

I claim:

1. A drive system for moving a recording tape at a constant speed in either of two directions between two tape-carrying spools comprising:

a. a first motor coupled to a first of said spools to drive said first spool in a first direction;

b. a second motor coupled to the second of said spools to drive said second spool in a second direction;

c. a coded signal recorded on and having a constant wavelength with respect to said recording tape;

d. pickup means for sensing said coded signal;

e. processing means coupled to said pickup means for generating a control voltage proportional to the frequency of the coded signal as sensed by the pickup means;

f. means for supplying a reference voltage;

g. means for comparing said control voltage and said reference voltage to provide a correction voltage;

h. variable power means controlled by said correction voltage and selectively connectable to either of said first or second motor to supply power to the connected motor of such values as to produce movement of the tape at a constant speed; and i. means coupled between the processing means and the variable power means for sensing any absence of the coded signal and for generating a fail-safe voltage during such absence to further control the variable power means.